United States Patent [19]

Zimmer et al.

[11] Patent Number: 5,457,641
[45] Date of Patent: Oct. 10, 1995

[54] METHOD AND APPARATUS FOR DETERMINING AN ORIENTATION ASSOCIATED WITH A MOBILE SYSTEM, ESPECIALLY A LINE OF SIGHT INSIDE A HELMET VISOR

[75] Inventors: Pierre Zimmer, St Medard en Jalles; Alain Cordonnier, Bordeaux, both of France

[73] Assignee: Sextant Avionique, Meudon la Foret, France

[21] Appl. No.: 311,435

[22] Filed: Sep. 26, 1994

Related U.S. Application Data

[60] Continuation of Ser. No. 962,593, filed as PCT/FR91/00478 on Jun. 14, 1991 abandoned.

[30] Foreign Application Priority Data

Jun. 29, 1990 [FR] France .................................. 90 08230

[51] Int. Cl.⁶ .................................................. G01B 7/004
[52] U.S. Cl. ............... 364/559; 324/207.13; 324/207.18; 345/7; 345/8
[58] Field of Search ...................... 89/41.21; 324/207.13, 324/207.18, 247; 342/451; 345/7, 8; 364/559

[56] References Cited

U.S. PATENT DOCUMENTS

| | | | |
|---|---|---|---|
| 3,659,085 | 4/1972 | Potter et al. | 342/451 X |
| 4,287,809 | 9/1981 | Egli et al. | 89/41.21 |
| 4,396,885 | 8/1983 | Constant | 342/451 X |
| 4,688,037 | 8/1987 | Krieg | 340/825.72 |
| 4,768,028 | 8/1988 | Blackie | 345/8 |
| 5,130,794 | 7/1992 | Ritchey | 358/87 |
| 5,264,793 | 11/1993 | Lo et al. | 364/561 X |

FOREIGN PATENT DOCUMENTS

| | | |
|---|---|---|
| 0021906 | 1/1981 | European Pat. Off. . |
| 0363619 | 4/1990 | European Pat. Off. . |
| 3326254 | 1/1985 | Germany . |

Primary Examiner—Edward R. Cosimano
Attorney, Agent, or Firm—Oblon, Spivak, McClelland, Maier & Neustadt

[57] ABSTRACT

A method for determining a line of sight from a visor borne by a helmet fitted with a pick-up with three magnetic orthogonal coils, in relation to a mark affixed to an aircraft concretized by an emitter with three magnetic orthogonal coils, consists of initially setting up a magnetic cartography of the piloting cabin: to this end sets of measurements of fields picked up by the pick-up from fields emitted in succession by the three coils of the emitter, for different known positions and orientations of the pick-up inside the cabin, are established then entered in memory. Then the method consists of setting up, based on those measurements, a magnetic modeling of the piloting cabin. In flight, the measurement matrix, associated with a cycle of emission from the emitter, triggered when the pilot validates a line of sight in a given direction in relation to his helmet, makes it possible by using the preliminary modeling to compute accurately the orientation of that line of sight inside the mark of the aircraft.

13 Claims, 2 Drawing Sheets

10,000,000

METHOD AND APPARATUS FOR DETERMINING AN ORIENTATION ASSOCIATED WITH A MOBILE SYSTEM, ESPECIALLY A LINE OF SIGHT INSIDE A HELMET VISOR

This application is a Continuation of application Ser. No. 07/962,593, filed Feb. 25, 1993abandoned, which was filed as International Application No. PCT/FR91/00478 on Jun. 14, 1991.

BACKGROUND OF THE INVENTION

1. Field of the Invention

This invention pertains to the determination of an orientation associated with a mobile system, for instance a helmet visor and corresponding apparatus, for determining an orientation associated with a mobile system with greater accuracy.

2. Description of the Related Art

The question involves accurately pinpointing the orientation of a directed axis without having physical contact with it, such as helmet visor systems used in fighter aircraft or helicopters. The operation of such a system is briefly recalled herein: a pilot sees, with an ancillary sighting device, and through a half-reflecting pane that is attached to the helmet and set on a vision axis, the image of a reticula is projected at infinity and superimposed on the outside scene. When the pilot wants to designate a target, the pilot moves the reticula to coincide with the target and he signals that the coincidence is executed, for instance with a push-button control that was conceived for this purpose.

Provided that the precise orientation of the helmet is pinpointed when the reticula coincides with the target, it is possible to determine, in relation to the aircraft, the sight orientation and to designate the target for a weapons system, or to point an optical system or other system in that direction.

French patent no. 79 14441 discloses an orientation measure apparatus, for a helmet visor system. To bring the line of sight determined by the position of the helmet of the pilot into a coordinate frame associated with the aircraft, a position pick-up comprised of three electro-magnetic orthogonal coils is placed on the helmet. At a fixed point in the cabin, there are three other electro-magnetic coils, which form a static transmitter or "radiator" according to the terminology in use in that field. Then is successively made to electric current, cross, through each coil of the transmitter (which forms the static trihedron). These currents make three magnetic fields appear which are picked up by the coils of the pick-up (which forms the mobile trihedron associated with the helmet).

For each magnetic field that is emitted, the three corresponding electro-magnetic orthogonal components are picked up inside the coils of the pick-up. The nine resulting components make it possible to find the transformation (rotation) that enables passage from the mobile trihedron to the static trihedron. Indeed, those nine components rely:

on the position of the pick-up in space; and the orientation or pure notation of the pick-up.

The above method is flawed. The transformation that results from the above method can be quite different from the actual transformation of the coordinates which allow effective passage from the mobile reference trihedron to the static reference trihedron in relation to the aircraft, especially because magnetic fields are used. Indeed, those fields can be disrupted because of metallic elements in the cabin environment, creating reflections of magnetic waves inside the cabin. Furthermore, flaws inherent to the execution of emitting or receiving magnetic, radiation also create disturbances.

Determining an orientation by using the laws of electromagnetism in free space is, therefore, not possible when the space under consideration is the piloting cabin of the aircraft. Some familiar devices build into memory storage, prior to each measurement, preliminary measurements representing electromagnetic disturbances in the cabin. Comparison of the preliminary measurements carried out at a given time with the measurements stored in memory determines the rotation that allows for passage from the static trihedron to the mobile trihedron. However such a method requires storing in memory a very substantial volume of measurements which must be completely recalled as soon as parameters change, such as the exact position of the mobile emitter in relation to the line of sight.

The invention provides a method and corresponding apparatus for determining an orientation inside a mobile system that makes it possible to use in operation the same measuring method, previously discussed, without the above-mentioned flaws.

To this end, in a preliminary phase, modeling takes into account the disturbances in particular of magnetic origin, inside the cabin wherein the sensing system is placed. The modelling is set up based on specific known directions of the mobile pick-up or on specific known directions of the line of sight and for each direction based on a set of m positions, the origin of the mark comprised of the mobile pick-up. This preliminary phase, based on real measurements, makes it possible to broach the complex relations between position and orientation resulting from the reflecting of magnetic waves and the physical limitations of the emitter and the pick-up. This preliminary phase leads to the preliminary determination of a global modeling function by factoring in disruptive effects. This preliminary phase, ultimately completed through initialing during flight, makes it possible in operation to directly determine the direction associated with any position of the mobile system, based on real experimental measurements.

According to the invention, a method for determining an orientation associated with a mobile system inside a given space, by using a magnetic system for position and orientation sensing, is provided. An emitter made of three orthogonal coils that have a static position inside the given space and a pick-up made of three orthogonal coils affixed to the mobile system are included, r being the distance between the origin of the emitter mark and the origin of the pick-up mark. A sensing cycle consisting of the successive emitting in the three coils of the emitter and of measuring the field components generated in the coils of the receiver, is characterized by a preliminary modeling phase of the given space which consists of conducting measurements of the magnetic fields in the pick-up for a set of known positions of the mobile system in relation to a mark known as the cartographic mark. Modelling parameters are deduced from the reference measurements at each point being computed to deduce therefrom the relative rotation of the pick-up in the cartographic mark of the reference measurements. Thus, the instant orientation of the mobile system is directly determined based on modeling parameters comprising a compact modeling function position of the disruptive effects, which area function of the position.

The invention also provides an apparatus aimed at implementing this method.

SUMMARY OF THE INVENTION

The present invention concerns a method and an apparatus for determining an orientation which is associated with a mobile system (the helmet) with respect to a reference system (the aircraft).

It has to be understood that the main problem is to determine the orientation of the coordinate frame (2) associated with the mobile system with respect to the reference coordinate system (1) associated with the aircraft, that is to say the rotation matrix R which enables a change of coordinate frame from (2) to (1). Once R has been determined, it is then possible to express any orientation or direction which is associated with the mobile system (for instance the line of sight of the helmet visor) in the reference coordinate system (1).

As explained in French Patent No. 79 14441, the determination of the orientation is obtained by means of three transmitting electromagnetic coils representing the reference coordinate frame (1), and of three receiving electromagnetic coils representing the mobile coordinate frame (2), according to the method explained below.

However, in order to determine the rotation R, it is not possible to use Maxwell equations since the cabin space is not a free space and since disturbances due to the coils and the reflections on metallic elements have to be taken under consideration.

To solve this problem, the process according to the invention has a preliminary phase (before flight) during which a magnetic cartography of the cabin space is done for a known orientation of the pick-up and for a plurality of positions of this pick-up. This preliminary phase is summarized in FIG. 2, steps 11 to 17. During these steps, a global function $F_p$ translating the disruptive effects associated with the displacement of the pick-up for the known orientation is determined, according to the method explained below.

The preliminary phase can then be completed by a phase during which a function $F_R$ translating the disruptive effects induced by the rotation of the pick-up is determined.

It should be noticed that the global function $F_p$ leads to an initial approximation of the cartography matrix and then of the rotation of the pick-up with respect to the aircraft system.

The result is improved by completing the initial phase with the determination of the function $F_R$.

Then, during the flight, the measurement of a matrix M enables the direct determination of the rotation R of the helmet with respect to the helmet system.

Once R has been determined, it is possible to express the line of sight of the helmet visor with respect to the reference coordinate system. It has to be noticed that the line of sight is fixed with respect to the mobile system. Indeed, the line of sight is determined by the position of the visor on the helmet.

If the orientation of the line of sight with respect to the helmet is known, it is easy to operate the change of coordinate system.

However, the user may adjust, during flight, the visor with respect to the helmet when he puts the helmet on. In this case, the orientation of the line of sight with respect to the helmet is not known.

It is, therefore, necessary to realize an initialing step.

The method according to the invention can be improved with the help of a compensative step wherein all the measurements are done not only with the pick-up, but also with the helmet.

A variant for determining the line of sight consists of the determination of Matrix I by means of virtual measurements matrices $M_v$, according to the method indicated below. The measurements in the preliminary phase are made directly with the pick-up and the helmet. It should be noticed that the method involved in this variant is the same as previously (Computation of a global function $F'_p$ for which $r^4 M_v = F'p (r^7 tMM)$.

The invention will be better understood and other features will appear with the help of the description that follows in reference to the invention.

DESCRIPTION OF THE PREFERRED EMBODIMENTS

Figure 1:
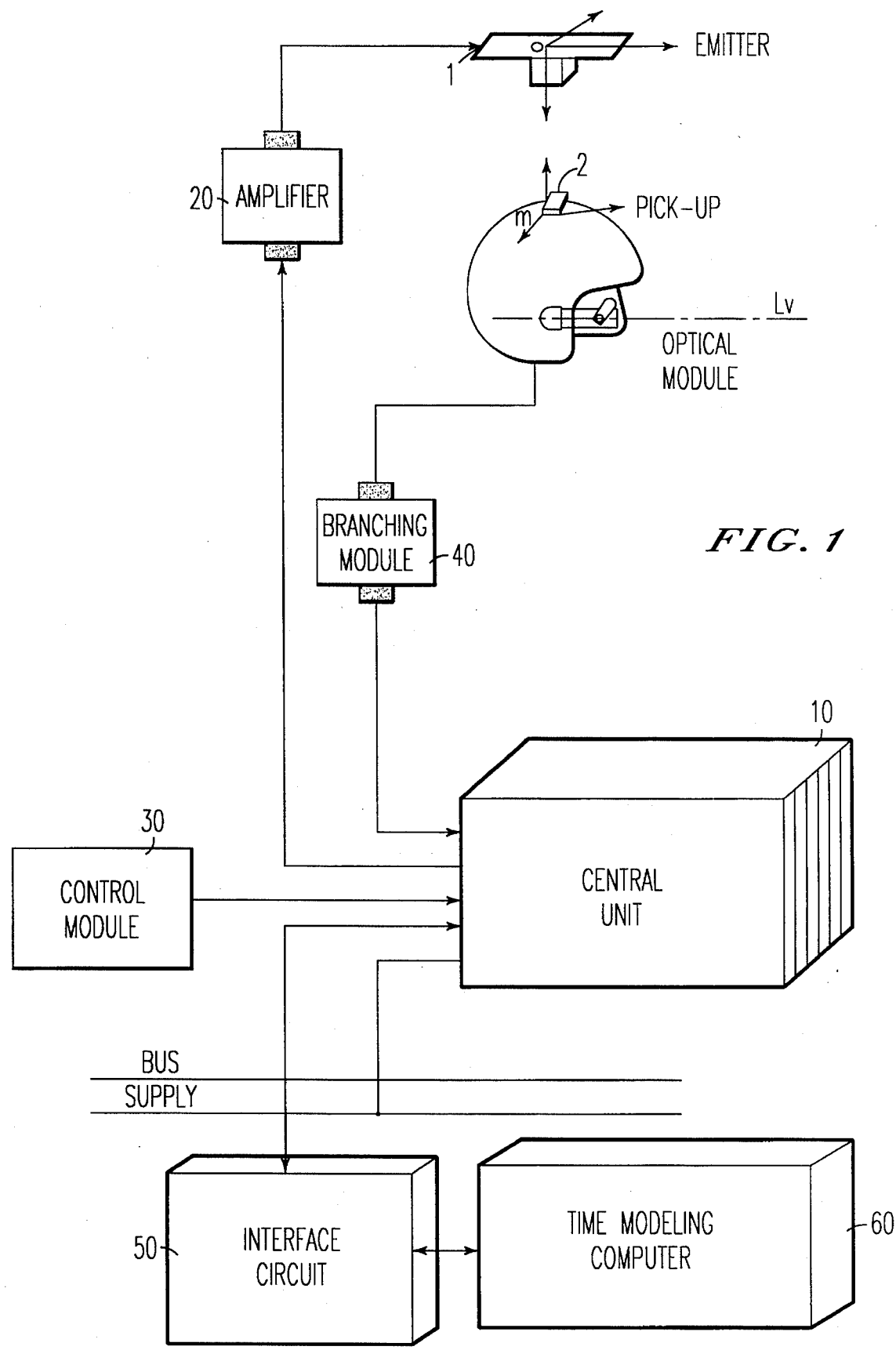
FIG. 1 is a synoptic scheme of the apparatus according to the invention.

FIG. 1 schematically depicts an emitter 1 which includes three coils placed according to a trirectangular trihedron. This emitter 1 is placed at a fixed point of a given space, such as the piloting cabin of an aircraft. A central unit 10, which is part of an electronic equipment unit on board, sends an electrical excitation signal successively to the three coils of the emitter 1, during successive cycles, via an amplifier apparatus 20 controlled from a control panel 30.

A pick-up 2, placed in flight phase on the helmet of the aircraft pilot and also comprised of three coils arranged like a trirectangular trihedron, is also connected to the central unit 10 by way of a branching module 40. This pick-up freely moves inside the given space during flight phase according to the head movements of the pilot and during a preliminary phase by way of a robot for creating pre-set positions. The central unit 10 includes a measurement organ which receives from the pick-up 2, during each measuring cycle, nine signals, in 3 times 3 signals, which are the signals induced from the successive feed of each of the coils in emitter 1. The amplitudes of those nine signals are mathematically arranged in a nine value, square matrix measuring 3×3. Then, we determine, with regard to the laws of electromagnetism, the transformation, i.e. the rotation, which enables passage from the mobile mark comprised of the pick-up 2 to the aircraft mark.

As a convention, the origin mark of the emitter 1 is designated point 0, m is the position of the pick-up, the distance om between the emitter 1 and the pick-up 2 is called r, and om/om=u is the unit vector in the direction om with x, y, z are vector the projections in the static trihedron.

At the point m of the pick-up an initial measurement is conducted, and a matrix of nine components P is obtained. Then a second measurement is conducted with a different direction of the pick-up at the same point m, and a second matrix M of nine components is obtained. Thus, the matrix M can be written as the product of two matrices:

$$M = R.P.$$

where R is a matrix that corresponds to a pure rotation of the pick-up and P is the matrix corresponding to the initial orientation measurement, so that:

$$tR = R^{-1}$$

which says that the transposed matrix $^tR$ of a rotation matrix is equal to its inverse $R^{-1}$; therefore the product of the transposed matrix $^tM$ of M by M is written as follows:

$$^tM \cdot M = ^tP \cdot ^tR \cdot R \cdot P = ^tP \cdot R^{-1} \cdot R \cdot P = ^tP \cdot P,$$

which states that the transpose of matrix M times the matrix M equals the transpose of matrix P times Matrix P.

Therefore, the product of a measurement matrix transposed with the matrix proper is theoretically invariant at a given point m, regardless of the rotation of the mark; the produced matrix is also symmetrical.

Theoretically, P and $^tM.M$ can be expressed according to r, x, y, z with Maxwell equations that characterize the laws of electro-magnetic propagation. However, it is not possible in actuality because the emitter and the pick-up are not perfect dipoles, since the space of the cabin is not an open space, and the helmet bears disruptive mobile masses at the same time as the pilot. Therefore, the product of a measurement matrix with its transpose varies if the pick-up is rotated in a real environment.

To resolve this problem, the method according to the invention consists of first performing a preliminary phase and modeling based on real measurements conducted for known pre-set positions and orientations of the pick-up without the helmet or pilot in the cabin (or a line of sight which is connected to it). Then, during an operation phase when the pick-up is attached to the helmet, actual orientations are calculated.

In a preliminary phase, the central unit controls systematic measurements, conducted initially while always maintaining the same rotational orientation toward a pick-up 2, and according to a meshing consisting of a set of points m of the cabin where the pick-up 2 can be found when it is placed on the helmet of the pilot at his piloting station. This results in obtaining a set of measuring matrices, the size of which is 3 by 3 and correspond to the set of points m. These matrices are transmitted, by an interface circuit 50 to the memory of a so-called deferred time modeling computer 60 to be stored and processed. The preliminary phase measurements can be measured with only the receiver and a magnetic cartography pick-up moved about by a robot, i.e., without the helmet or the pilot. These measurements, therefore, make it possible to set up a magnetic "cartography" of the volume in which the pick-up 2 can be found, for a specific rotational orientation of this pick-up. Preferably, this plotting is conducted according to a regular meshing in the three axes, with a step of 3 to 4 cm.

Then, other measurements are conducted, still with the cartography pick-up detached from the helmet, but with other orientations mechanically known to the pick-up, at several regularly spaced points.

If P is identified to the measuring matrix obtained when the axes of the coils of the pick-up coincide with the cartography mark, in other words the static mark of the robot directly associated with the aircraft mark, a global function $F_p$ connecting the components of P to the components of $^tMM$ is calculated based on measurement matrices corresponding to the first orientation, preferably the orientation where the axes of the coils coincide with the cartography mark. Therefore, this function represents the disruptive effects associated with the displacement of the pick-up in the cabin, the pick-up being kept in a static orientation, without rotating the pick-up. In one embodiment, the global function is calculated by searching for 9 optimal polynomial relations that connect each component of the matrix P (to nine components) to the 6 components of the symmetrical matrix $^tMM$. The coefficients of the monomials in each of the 9 polynomials make up the sought global function $F_p$. The resolution is facilitated by the following homogenization:

$$r^4 P = F_p(r^7 \cdot ^tMM),$$

where r=Om, the distance between the emitter and the pick-up. Indeed, the magnetic fields that decrease in $1/r^3$, a matrix product of the $^tMM$ type decreases in $1/r^6$; in order to search for a function that connects P to $^tMM$, it is interesting to homogenize in size the two entities to be connected, and to find for them a common favorable size. The preferred size is the distance r. To reiterate, only n measurements in n different points m of the cabin where the pick-up can be found are necessary to derive $F_p$.

The best approximation for r is given by the value of the radical $6^e$ of the trace of the matrix $^tMM$, stemming from the calculation in dipolar conditions.

Following the homogenization as stated above, we identify each component of the matrix $r^4 P$ with a polynomial function of the terms of the matrix $r^7 \, ^tMM$, through linear regression on the 6 terms of $r^7 \, ^tM.M$ by adopting as regressors $e_k$ all the degree products not greater than a degree of 3 computed at a point m based on the measurement matrix M at that point. The degree products 1 are the six terms $r^7 \, ^tM.M$, the degree products 2 are all the products of two terms of $^tMM$, including the square terms, etc. Up to an order 3, for the 6 terms of $r^7 \, ^tMM$ stemming from a measuring matrix M at point m, there is k=84 regressors $e_k$. If n measurements, each providing a matrix M have been established at n points m, each component of $r^4(P)$, Pj (j=1 to 9) is identified at n polynomials function each one from a different set of regressors $(E)_i=(e_1, e_2, \ldots e_k)_i$, i=1 to n calculated based on the components of $r^7 \, ^tM.M$, and the coefficients $(a_0, a_1, \ldots a_k)_j$ sought for that component:

$$P_j = a_0 + a_1 e_1 + \ldots a_k e_k.$$

The coefficients are obtained by resolving, in terms of the lesser squares therein described by the GRAM SCHMIDT method, the 9 independent systems, P=E.A, where E is the line matrix defined by the k regressors computed for each point m of the cartography (E a k columns and n lines). A is the sought matrix column formed by the coefficients $(a_0, \ldots a_k)_j$ of j=1 to 9, and P is the matrix column comprised of the measured value of that component Pj repeated n times.

The direct use of the 9 sets of coefficients $(a_0 \ldots a_k)_1 \ldots (a_0, \ldots a_k)_9$ leads to an initial approximation matrix Mc of the cartography matrix P and, therefore, of the three angles $G_1$ (bearing), $S_1$ (site) and $R_1$ (roll) characteristic of the rotation of the pick-up in relation to the cartography mark, and results in the relation M=R.Mc.

Then, during the next step of the preliminary phase, based on measurements conducted at several points in various orientations of the pick-up, a global function $F_r$ is determined such as $(G_2, S_2, R_2)=F_r(G_1, S_1, R_1, ^tMM)$, $(G_2, S_2, R_2)$ being true angles the pick-up is rotated. This global function $F_r$ presents the disruptive effects induced by the rotation of the pick-up.

This step consists therefore of seeking 3 optimal polynomial relations on the one hand between each true angle ($G_2$, $S_2$, $R_2$) and on the other hand the three approximated corresponding angles that stem from the measurement ($G_1$, $S_1$, $R_1$) previously computed and the various positions, in rotation, of the pick-up mark, in other words the 6 components of $r^7 \, ^tM.M$.

The method used is analogous to that used to search for $F_p$, in other words, we proceed with linear regression on the 6 terms of $r^7 \, ^tMM$ and the 3 terms $G_1$, $S_1$, $R_1$ by adopting as regressors all the degree products at most equal to 3, in other words a constant and the degree products 1, $G_1$, $S_1$, $R_1$ and the 6 terms of $'MM$, the degree products 2 which are the prior ones raised to square and the crossed terms of the type $G_1 S_1$, $G_1 R_1$ etc. . . . ($G_1$) ($'MM)_{ij}$ . . . ($R_1$) ($'MM)_{ij}$ etc.

The degree being limited to 3, we are led to compute 220 regressors.

The direct use of the 3 sets of coefficients $a_i$ that constitute the modeling parameters stemming from this modeling algorithm, therefore, allows us to obtain, with very high degree of accuracy, the orientation of the pick-up in the cartography mark, based on the approximated angles in a previous phase, $G_1$, $S_1$, $R_1$.

Thus, a true position of the pick-up is obtained by entering the received coordinates in the global function $F_p$ and a true rotation of the pick-up is obtained by entering the received rotational degrees ($G_1$, $S_1$, $R_1$) in the global function $F_R$.

Once the preliminary phase is complete and the cartography operations have been conducted as described above in the cabin of the bearer, and after the cartography measurements have been stored in the memory of the deferred time modeling computer unit 60, the modeling parameters stemming from the modeling algorithms described above are stored in memory inside the on-board central unit 10. Then, an operation phase is conducted by attaching the pick-up to the helmet and placing the helmet on a pilot's head. The measurements are conducted after the helmet has been adjusted (calibration of the optics, adjustment of its fastening on the pilot's head, etc . . . ).

If, at that time M is a measurement matrix corresponding to the magnetic field components sensed in the mark comprised by the pick-up fastened to the helmet during the successive emitting of the three coils of the static emitter for a position of the helmet and, therefore, of the mobile mark, then the product $'M.M$ is computed and the measurement of the angles of the pick-up in the cartography mark, Mc, can be directly computed:

The rotation R of the pick-up associated with the helmet in relation to the cartography pick-up is then determined by:

$$R = McM^{-1}.$$

The orientation of the pick-up being then set in an accurate manner, it is possible to quickly perform, if we know the rotation matrix I of the line of sight in relation to the pick-up, the transformation that enables passage from the pick-up mark to the cartographic mark associated with the aircraft mark, especially for providing a fire control system the firing direction set from the helmet visor.

The equation of the line of sight Lv in the mark associated with the bearer is then obtained as follows: $Lv = RI^{-1}$ where $R = McM^{-1}$ or $Lv = McM^{-1}I^{-1}$.

But, as a general rule, an initialing step of the line of sight or initial alignment, must be envisioned, because the various adjustment possibilities offered to the user do not make it possible to know, a priori, the orientation of the line of sight in the mark of the pick-up on the helmet. For that, a pick-up measurement is preformed by the pilot when he indicates the line of sight to the apparatus while aiming a sighting device reticula. Let Lvo be a pre-set initialing direction, and let Mo be the pick-up measurement taken when the pilot aimed the reticula. Then, the corresponding measurement Mco in the cartography mark is computed during the operation phase and we calculate the initialing matrix as follows:

$$I^{-1} = McoMo^{-1}.$$

Furthermore, when the cartography mark is not the one of the current pilot such as when pilots switch aircraft, it is necessary to conduct a change of mark, known as "harmonizing" characterized by a harmonizing matrix H, and we have:

$$Lv = HRi \ H^{-1} Lvo$$

or still $Lv = H(McM^{-1})(MoMco^{-1})H^{-1}Lvo$.

We should be able to approximate the terms R and I accurately with the function $F_r$ that is comprised of the modeling parameters described above. Actually, the application of that function to this step of the method can turn out to be inefficient because of the disruptive elements associated with the helmet, like the cathode tubes for instance.

Therefore, a compensating step of the disruptive elements associated with the helmet is also implemented, according to the same approach as described above (to take into account the disruptive elements associated with the cabin or due to flaws in the emitter or the pick-up). To this end, a set of measurements are taken, with the helmet at several regularly spaced points and in various orientations, that are mechanically known. One of those orientations coincides with the approximate direction of the sight orientation known as Lvo initialing.

The application of the global function Fp makes it possible to determine an initial approximation of I and of each pick-up rotation tied to the various orientations, and thus enables the definition of an initial approximation of the orientation of the line of sight with ($G_1$, $S_1$, $R_1$).

At this algorithmic level, the result, however inaccurate, is already highly independent of the value of I of the initialing in real use. Indeed the product $RI^{-1}$ regardless of the assembly of the pick-up on the helmet is always associated with the line of sight. The value of I found during cartography corresponds to a specific adjustment of the helmet.

A function $F_r$ which takes into account the presence of the helmet and directly modeling the theoretical line of sight ($G_2$, $S_2$, $R_2$) based on $G_1$, $S_1$, $R_1$ and $r^7 \ 'MM$ is then determined.

Figure 2:
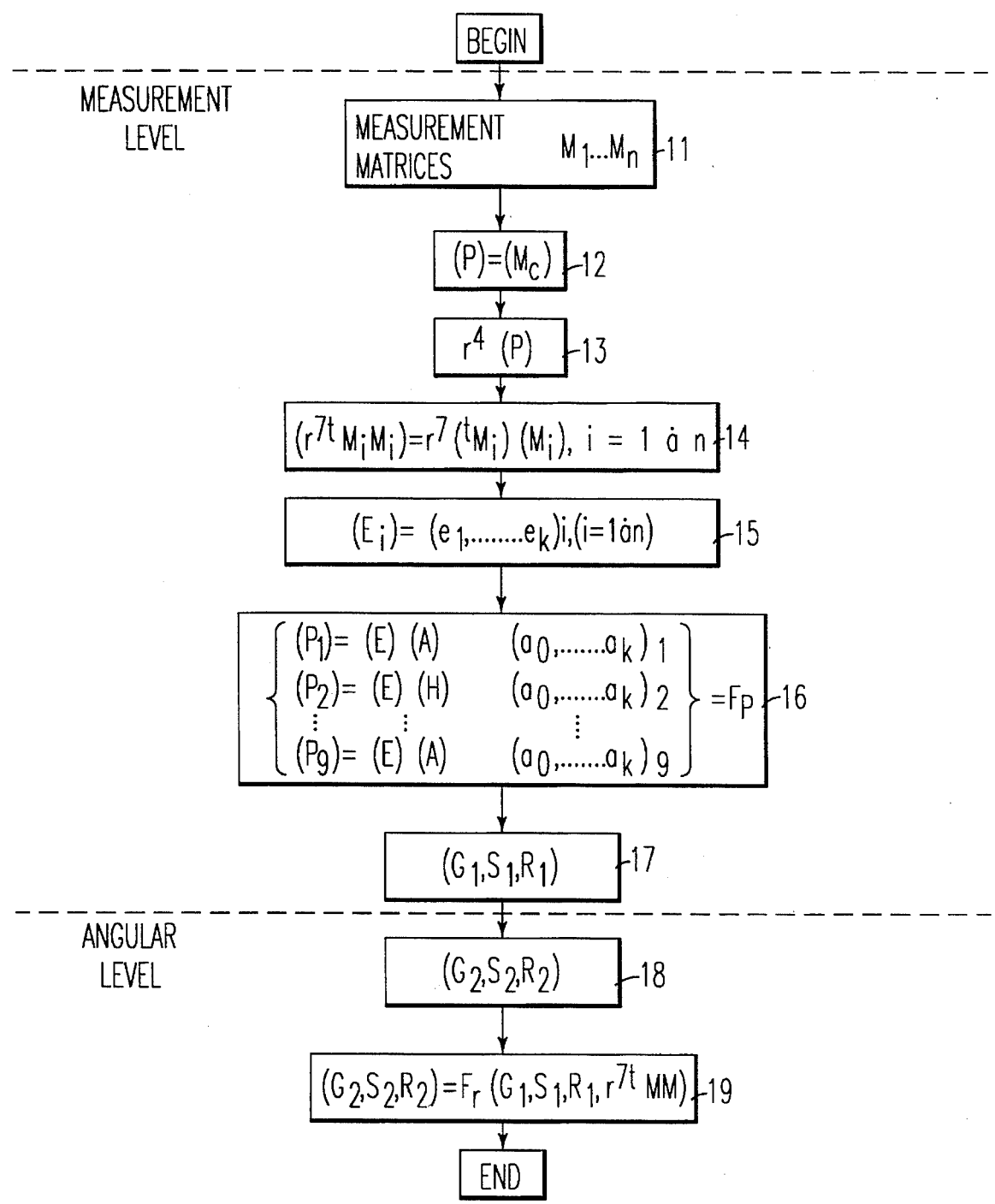
FIG. 2 illustrates the various steps of the method according to the invention.

FIG. 2 illustrates synthetically the various steps of the modeling phase of the method for determining orientation according to the invention in its initial version as stated above:

The first step 11 is the one for acquiring measurement matrices $M_1, \ldots M_n$ for a set of n positions of m, for a given orientation of the pick-up;

the second step 12 is the identification of the matrix P with the measurement matrix (Mc) which corresponds to the position of the pick-up that coincides with the cartography mark;

The third step 13 is calculating r, then the matrix $r^4(P)$ as stated above;

The fourth step 14 is the computation step for all matrices with measurements of $M_1$ of $(r^7 \ 'M_i M_i) = r^7('M_i)(M_i)$ for i=1 to n;

The fifth step 15 is the step for computing the n sets of regressors $(E_i) = (e_1 \ldots e_k)_i$ for i=1 to n;

The sixth step 16 is the step for resolving the 9 equation systems P=E.A in terms of the least squares, to determine the sets of coefficients $(a_0 \ldots a_k)_1 \ldots (a_0 \ldots a_k)_9$ that make up the modeling function $F_p$;

The seventh step 17 makes it possible to find based on this modeling function, an initial approximation of the cartography matrix Mc and therefore of the rotation pick up ration to the cartography mark $[G_1, S_1, R_1]$.

This step ends the initial measurement level.

Then, for the so-called "angular" level, a step 18 is performed for acquiring measurements for various orientations familiar to the pick-up.

A computation step 19 makes it possible then to seek, based on these measurements, the global function $F_r$.

A variant of the method according to the invention that makes it possible to avoid the preliminary phase of acquiring measurements (pick-up in a static orientation moving alone) consists of computing, for each measurement with helmet, a matrix of virtual measurement Mv such as: $Lv = HMvM^{-1} I^{-1} H^{-1} Lvo$.

Obviously, I can be determined based on a cartography derived with the pick-up on static orientation and the corresponding function $F_p$. But, it is preferable to determine I with an iterative method, as described below.

At each phase of the iteration, the selected rotation matrix I of (G, S, R) leads to a series of virtual measurements Mv based on which a function $F'_p$ is computed through optimization, so that $MvM^{-1}ILvo$ is the closest possible of Lv, through the relation $r^4 Mv = F'_p(r^7 \,'MM)$.

Following the iteration, we simultaneously obtain the value of I and the associated virtual measurements Mv.

The virtual measurements provide a gain in relation to the previous measurements because they erase the distortion linked to the rotation of the pick-up and integrate the deformations due to the disrupting measurements associated with the helmet.

Furthermore, the iterative search for I makes it possible to avoid the phase of initial measurements from only the pick-up in static orientation.

Finally, the function $F'_p$ is also optimized. The computation time for modeling is obviously a bit longer, while still acceptable, as a result of the optimization of I.

The last step is the computation of the function $F_r$ directly modeling the theoretical line of sight based on the best function $F'_p$ which is obtained from the same measurements The method is also adapted to a direct correction of the optical distortions tied to the windshield (or glass pane) of the bearer, during sight. For that, those distortions are introduced during the determination of $F_r$, either by computation, or by real sight test, automatically or controlled by the pilot.

An advantage of the method according to the invention is that the preliminary determination of a compact modeling function makes it possible to take into account aberrations of a magnetic system for sensing position and orientation when such a system is used in a disruptive metallic environment, like a helicopter cabin. This compact modeling function is determined from experimental measurements conducted for known positions of the pick-up mark or directly of the line of sight. Then, in flight, the use of the system in real time is quick, leads to reliable measurements, and only requires little memory space in the loaded system.

The invention is not limited to the embodiments described above. In particular, at the measurement level which leads to the obtaining of modeling parameters for the reference measurements, the identification of components of the measurement to a polynomial has been described as being performed by linear regression on the 6 terms of $r^7 \,'MM$.

In order to improve this step, it is possible to perform a linear regression on a higher number of terms, 9 for instance, by adding to the 6 terms of $r^7 \,'MM$, the 3 scalar products on line of the matrix M, those terms being relevant to the rotation, or still 3 terms µi defined by $r^4(M)_{ii} = r^7 Mi('MM)_{ii}$, e.g. terms that connect the diagonal terms of M to the diagonal terms of 'MM. In those two instances, the function $F_p$ is determined by 220 regressors.

Another possibility consists of using the terms µi described above, except for the products where no term of the matrix 'MM appears. For those products, the µi are replaced with the scalar products on line of the matrix M.

Furthermore, it was shown above that the search for coefficients linking one component of P to the various terms of 'MM had been facilitated by the following kind of homogenization:

$$r^4 P = F_p(r^7 \,'MM)$$

Actually, in an analogous manner to that described for optimizing I in the described variant, it is possible to conduct iterative optimization (for instance with the FIBONACCI method) on the exponent of r. Experience tells us that such optimizing can lead to a replacement of $r^7$ with $r^{ex}$ where ex has a non-whole value included for instance between 6.5 and 7 and which can depend on the environment.

Furthermore, with regards to the modeling of the angular intervals and the computation of the line of sight which results from the precise rotation, a simplification process can be implemented that allows a time savings in computation. To that end, the matrix 3×3, $ROT = McM^{-1}MoMco^{-1}$ is computed and the 9 terms of that matrix ROT are used as regressors for the direct modeling of angular intervals on G, S or R. $F_r$ is calculated such that G (or S, or R) = $F_r$((ROT)).

A similar method consists of modeling the intervals on the terms of the matrix ROT proper, each component of the matrix $ROT = McM^{-1}MoMco^{-1}$ being expressed based on a polynomial comprising the 9 components stemming from the first step. The angles are then extracted from the matrix following the regression.

The reader will easily understand that other modifications can be brought about, especially for conducting faster computations or for improving the accuracy of the results obtained without exceeding the framework of the invention, i.e., continuously conducting a preliminary phase of modeling the complex relations that connect the real measures to the position of the pick-up, or to the orientation of the line of sight that is connected to it.

In an implementation example of the variant that makes use of preset orientations of the line of sight, modeling has been obtained from 85 orientations and for each of these orientations 27 measurement points (i.e., 27 positions of m), or 9 points that equally distributed over 3 equidistant planes that form a cubic meshing of which the step is of about 3 to 4 cm. The measures have been performed for values of:

R=0° and G=[90°, 60°, 30°, 0°, −30°, −60°, −90°]
  S=[40°, 20°, 0°, −20°, −40°] where R=0
and R=(+10°, −10°) and G=[90°, 45°, 0; −45°, −90°]
  and S=[40°, 20°, 0°, −20°, −40°]

or 2295 points of measurement m. The needed time to compute for the previous modeling is a function of the power of the means of computation. As an example for obtaining $F_p$ based on 220 regressors, the length of the computation can be of about 3 hours; based on 84 regressors, the computation of a modeling function can last about 5 minutes.

We claim:

1. A process for determining an orientation associated with a mobile system in a given space, by using a magnetic system for determining the relative orientation of said mobile system in said given space, said magnetic system including an emitter including three orthogonal coils which define a reference coordinate frame (1) of the given space, and a pick-up attached to the mobile system and comprising three orthogonal coils defining a coordinate frame (2) of the mobile system, said magnetic system having a sensing cycle consisting of emitting in succession inside the three coils of the emitter and of measuring measurement matrices representing the field components generated in the three coils of the pick-up, wherein the process comprises:

a preliminary phase executed while the pick-up is detached from the mobile system and an operator is not in the given space, comprising the steps of:

acquiring n measurement matrices $M_i$ for a set of n positions of the pick-up when the emitter emits electromagnetic waves and the pick-up receives the emitted electromagnetic waves, said pick-up being in a known orientation with respect to the reference coordinate frame;

identifying a reference matrix P which corresponds to a position of the pick-up coinciding with the reference coordinate frame;

determining a compact position modeling function ($F_p$) representative of disruptive effects as a function of the position of the pick-up, from the reference matrix P and the measurement matrices $M_i$;

an operation phase executed while the pick-up is attached to the mobile system comprising the steps of;

acquiring a measurement matrix M when the emitter emits electromagnetic waves and the pick-up receives the electromagnetic waves; and deducing from said measurement matrix M and from the compact position modeling function ($F_p$), the instant orientation (Lv) of the mobile system with respect to the reference coordinate frame.

2. A process according to claim 1, wherein the compact position modeling function ($F_p$) is determined by computing, for all the measurement matrices $M_i$, the matrix product $tM_iM_i$, and by researching through linear regression the polynomial relations that connect the component of the reference matrix P with the components of the matrix product $tM_iM_i$.

3. A process according to claim 1, wherein the preliminary phase is completed by a second phase consisting of:

acquiring a set of measurement matrices for a plurality of known orientations of the pick-up with respect to the reference coordinate frame;

determining a compact modeling function ($F_r$) representative of disruptive effects as a function of the orientation of the pick-up.

4. A process according to claim 1, further comprising:

improving the accuracy of the instant orientation (Lv) by modeling the instant orientation (Lv) during intervals between true orientations and computed orientations.

5. A process according to claim 1, wherein the computation of the instant orientation further comprises:

initially aligning the pick-up at a known position ($Lv_0$) with respect to the emitter, for determining an initialing matrix (I) that characterizes the rotation of the known position in relation to a cardiographic mark.

6. A process according to claim 1, wherein the computation of the compact position modeling function further comprises:

determining measurement matrices associated with a set of orientations defined on the basis of a static orientation; and deducing virtual measurement matrices (Mv) from determined instant orientations (Lv) and a corresponding measurement matrix (M).

7. A process according to claim 1, further comprising:

evaluating an initial rotation (I) of a static orientation ($Lv_0$) in relation to a cartographic mark, performed at the same time as a computation of virtual measurement matrices (Mv) using an iterative method which optimizes a compact modeling function (F'p) $r^4Mv = F'p (r^7 t_{MM})$, and such that $MvM^{-1}ILv_0$ approaches the instant orientation (Lv).

8. A process according to claim 1, wherein one rotation matrix $ROT = McM^{-1}MoMco^{-1}$ is computed on a basis of each said measurement matrix M, Mc being a matrix resulting from M after application of the compact position modeling function ($F_p$), Mo and Mco being the matrices M and Mc for a known static initialing orientation (Lvo), such that modeling of angular intervals is performed by identification of true known rotations ($G_2$, $S_2$, $R_2$) with polynomials comprised of regressors computed on terms of matrices ROT and resulting in coefficients comprising a modeling function ($F_r$) of disruptive effects.

9. A process according to claim 1, wherein a rotation matrix $ROT = McM^{-1}MoMco^{-1}$ is computed from each said measurement matrix M, Mc being a resulting matrix of M after application of the compact position modeling function ($F_p$) and Mo and Mco being matrices M and Mc for a known static initialing orientation (Lvo), such that modeling of the angular intervals is performed by identifying terms of a matrix ROT with polynomials formed from regressors computed on terms of the matrix ROT resulting in coefficients comprising a modeling function ($F_r$) of disruptive effects.

10. A process according to claim 1, wherein the compact position modeling function ($F_p$) is determined by computing, for all the measurement matrices $M_i$, the matrix product $tM_iM_i$, and by identifying, with the method of the least squares, the components of $r^4P$, r being the distance between the origin of the static coordinate frame and the mobile coordinate frame, with the components of $F_p$ ($r^{ex} tM_iM_i$), ex being an exponent between 6.5 and 7.

11. A process according to claim 10, wherein the exponent ex is equal to 7.

12. An apparatus for determining an orientation associated with a mobile system, comprising:

an emitter having three magnetic orthogonal coils which is statically positioned within an enclosure;

a pick-up having three orthogonal coils affixed to the mobile system for receiving electromagnetic signals from the emitter;

means for displacing the pick-up and the orientation of the mobile system according to a set of known positions;

means for field emission and measurement for emitting signals from the emitter and measuring the signals emitted by the pick-up;

computation means coupled with the means for field emission and measurement for computing the signals measured by the pick-up; and a modeling computer coupled with the computation means by way of an interface circuit for modeling an optimal compact position modeling function ($F'_p$) and for obtaining an orientation of the mobile system by inputting to the optimal compact position modelling function ($F'_p$) a received position of the pick-up when the pick-up is attached to the mobile system.

13. A process for determining an orientation associated with a mobile system in a given space, comprising the steps of:

determining a compact position modeling function ($F_p$) during a preliminary phase, comprising the substeps of:

positioning the pick-up within the given space using a robot, the pick-up unattached from the mobile system and positioned within the given space with no operator in the given space;

positioning the pick-up along a three-dimensional regular meshing in steps of three to four centimeters, the pick-up positioned at an n number of positions, for obtaining measurement matrices ($M_1 \ldots M_n$);

wherein the pick-up has a fixed rotational orientation with respect to the emitter for all of the n positions;

identifying a measuring matrix (P) corresponding to the position of the pick-up which coincides with a cartography mark, the cartography mark designating a position of the emitter within the given space where the axes of the coils of the pick-up correspond to the axes of the coils of the emitter;

determining a compact position modeling function ($F_p$) representative of electromagnetic disruptive effects and a function of the position of the pick-up, determined from the matrix (P) and the measurement matrices ($M_1 \ldots M_n$);

an operation phase comprising the substeps of:

determining an initialing matrix (I), corresponding to a rotational orientation of the mobile system when an operator is wearing the mobile system;

positioning the mobile system such that a line of sight is achieved between the mobile system and a target;

selecting the target;

acquiring a measurement matrix (M) for a particular position of the mobile system at a time the target is selected;

determining from said measurement matrix (M) and from the compact position modeling function ($F_p$) the instant rotational orientation (Lv) of the mobile system with respect to a reference coordinate frame; and wherein, the emitter coils emit electromagnetic waves and the pick-up coils receive the emitter electromagnetic waves, the received electromagnetic waves used to determine the position of the pick-up with respect to the emitter.

\* \* \* \* \*

UNITED STATES PATENT AND TRADEMARK OFFICE
CERTIFICATE OF CORRECTION

PATENT NO. : 5,457,641
DATED : October 10, 1995
INVENTOR(S) : Pierre ZIMMER, et al.

It is certified that error appears in the above-indentified patent and that said Letters Patent is hereby corrected as shown below:

On the title page, Item [54] and Column 1, Lines 1-5, the title should read:

--PROCESS AND APPARATUS FOR DETERMINING A LINE OF SIGHT INSIDE A HELMET VISOR--

Signed and Sealed this

Thirtieth Day of January, 1996

Attest:

BRUCE LEHMAN

Attesting Officer

Commissioner of Patents and Trademarks